United States Patent
Ezrielev et al.

(10) Patent No.: US 12,437,064 B2
(45) Date of Patent: Oct. 7, 2025

(54) RANSOMWARE DETECTION USING INODE TRAVERSAL SCORING

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 265 days.

(21) Appl. No.: 18/189,928

(22) Filed: Mar. 24, 2023

(65) Prior Publication Data

US 2024/0320327 A1    Sep. 26, 2024

(51) Int. Cl.
*G06F 21/55* (2013.01)
*G06F 21/62* (2013.01)

(52) U.S. Cl.
CPC ........ *G06F 21/554* (2013.01); *G06F 21/6218* (2013.01); *G06F 2221/034* (2013.01)

(58) Field of Classification Search
CPC ............... G06F 21/554; G06F 21/6218; G06F 2221/034; G06F 21/566
See application file for complete search history.

(56) References Cited

U.S. PATENT DOCUMENTS

| | | | | |
|---|---|---|---|---|
| 8,856,927 | B1 * | 10/2014 | Beloussov | G06F 21/568 726/23 |
| 8,924,725 | B2 * | 12/2014 | Russell | H04L 9/3242 713/168 |
| 9,990,301 | B1 * | 6/2018 | Kanaujia | G06F 12/0891 |
| 11,003,775 | B2 * | 5/2021 | Kraemer | H04L 63/1433 |
| 11,475,132 | B2 * | 10/2022 | Vasudeva | G06F 21/552 |
| 2021/0144143 | A1 * | 5/2021 | Pati | H04L 63/101 |
| 2022/0292187 | A1 * | 9/2022 | Bhagi | G06F 21/568 |
| 2023/0185772 | A1 * | 6/2023 | Luo | G06F 16/14 707/827 |
| 2024/0330486 | A1 * | 10/2024 | Rachman | H04L 63/08 |

FOREIGN PATENT DOCUMENTS

CN    111475336 A  *  7/2020  ....... G06F 18/24147

* cited by examiner

*Primary Examiner* — Christopher A Revak
(74) *Attorney, Agent, or Firm* — Workman Nydegger

(57) ABSTRACT

One example method includes monitoring a file access request made by a process, searching, in a pointer array that corresponds to the process, for a pointer to the file that was requested by the process, when the pointer is found in the pointer array, incrementing a score associated with the process, performing an anomaly detection check, and when an anomaly is detected, blocking access to the file by the process, and when no anomaly is detected, updating the pointer array to include a pointer to the file to which access was requested by the process.

20 Claims, 3 Drawing Sheets

RANSOMWARE DETECTION USING INODE TRAVERSAL SCORING

FIELD OF THE INVENTION

Embodiments of the present invention generally relate to detection of ransomware. More particularly, at least some embodiments of the invention relate to systems, hardware, software, computer-readable media, and methods, for using inode traversal scoring as an indicator of a possible ransomware attack.

BACKGROUND

Ransomware is malicious software, or 'malware,' designed to block user data access until a sum of money is paid to the attacker. Ransomware is prevalent and a major concern for customers, all over the world. Customers are looking for a way to detect ransomware on a storage array in real-time or near real-time.

Ransomware, like any malware, can gain access to the systems of an organization in several different ways. After ransomware has gained access to a system, it can begin encrypting the system files. Since encryption functionality is built into the operating system, the ransomware may simply access files, encrypt the files with an attacker-controlled key, and then replace the original versions of the files with the encrypted versions. Most ransomware variants are cautious in their selection of files to encrypt to ensure system stability and thus avoid detection, or at least timely detection. A scan of the filesystem by the ransomware, also referred to as a "scanning phase," enables the ransomware to map the files that were chosen to be encrypted. Some variants of ransomwares will also take steps to delete backup and shadow copies of files to make recovery of the files without the ransomware decryption key more difficult.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
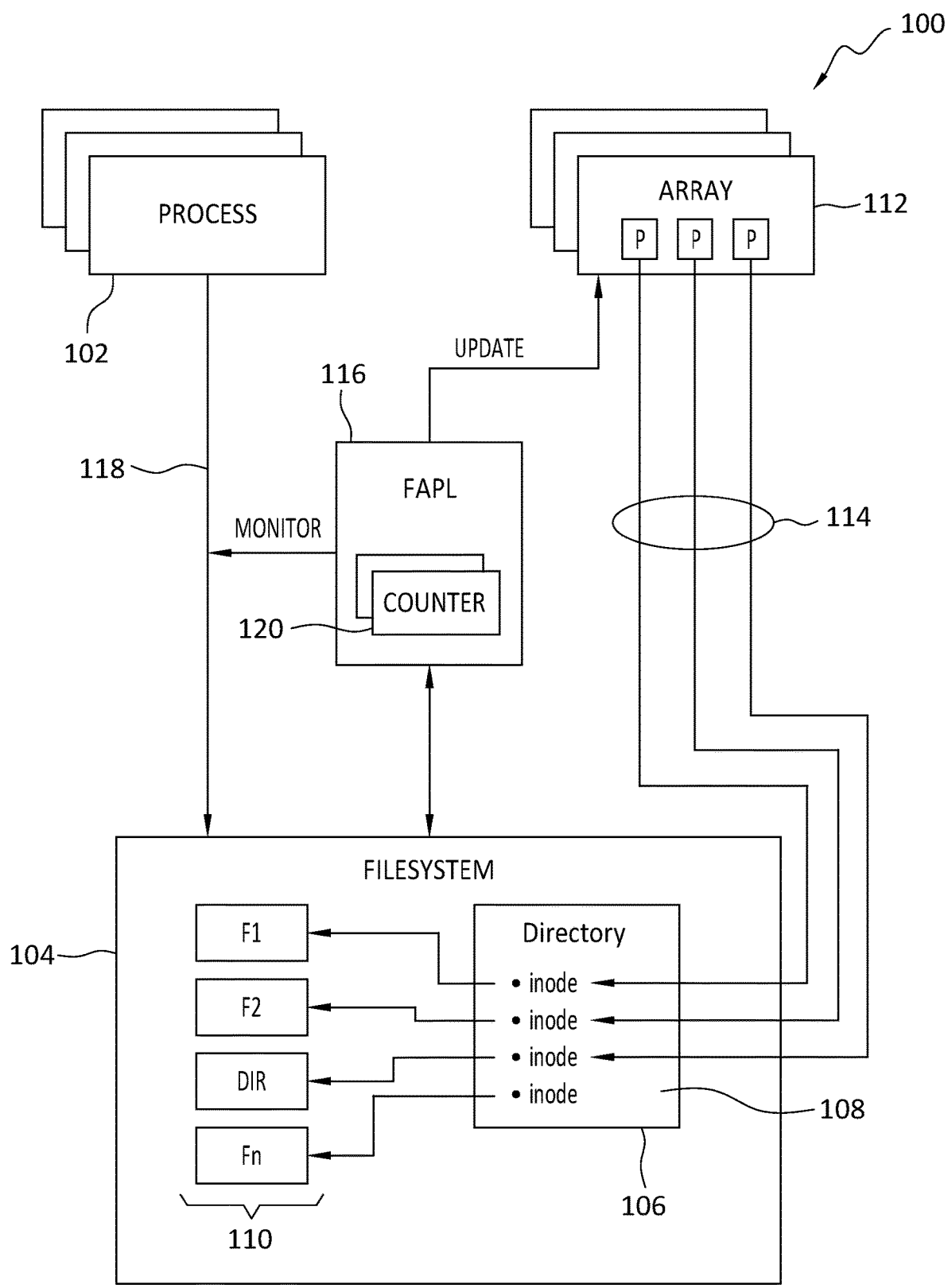
FIG. 1 discloses aspects of an architecture according to one embodiment.

Embodiments of the present invention generally relate to detection of ransomware. More particularly, at least some embodiments of the invention relate to systems, hardware, software, computer-readable media, and methods, for using inode traversal scoring as an indicator of a possible ransomware attack.

One example embodiment of the invention comprises a method that may detect, and block, a ransomware attack, possibly in real time as the attack is being attempted. An example method may operate in a kernel space and may monitor a process, running in a user space, for attempts by the process to access a file. In an embodiment, performance of the method may be triggered by an attempt to access the file. The process may be associated with a pointer array that may include respective pointers to files accessed by the process. When the process attempts to access a file, a search is performed of the pointer array for a pointer to the file that is being accessed. If a pointer to that file is found in the search, a score for the process may be incremented. If no such pointer is found, the process score may be decremented. If the pointer is found, and the process score is increased, a check may be performed to determine if an anomaly is present in the system. If an anomaly is discovered, operation of the process may be blocked, and an alert sent, such as to a system admin for example. If no anomaly is detected, or if the process score has been decreased, the array may be updated to include the pointer to the file to which the process requested access, and access to the file may then be granted.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that an embodiment may leverage knowledge about how a ransomware process operates in order to detect that ransomware process. As another example, an embodiment may detect a ransomware attack, or attempted ransomware attack, in real time. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. ASPECTS OF AN EXAMPLE ARCHITECTURE AND ENVIRONMENT

The following is a discussion of aspects of example operating environments for various embodiments of the invention. This discussion is not intended to limit the scope of the invention, or the applicability of the embodiments, in any way.

In general, one or more embodiments of the invention may be implemented in connection with systems, software, and components, that individually and/or collectively implement, and/or cause the implementation of, data access operations. It is noted that, as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

An embodiment of the invention may be implemented in connection with a Unix® operating system. However, no particular operating system or environment is required for any embodiment. While reference is made herein to an example Unix® operating environment, but such reference is for the purposes of illustration and is not intended to limit the scope of the invention in any way.

With particular attention now to FIG. 1, one example of an operating environment for embodiments of the invention is denoted generally at 100. In general, the operating environment 100 may comprise one or processes 102 running, or configured to run, in a user space. The processes 102 may communicate with a filesystem 104 to request access to assets, such as files and directories for example, of the filesystem 104.

In the example case of a Unix® based operating system, each file may be indexed by an inode. Inodes are special disk blocks that are created when the filesystem 104 is created. Each inode stores the attributes and disk block locations of the object data. File-system object attributes may include metadata, such as times of last changes to the file, when the file was accessed, and when the file was modified, as well as information about the owner of the file, and file permission data indicating, for examples, which users are authorized to access the file, and for what purpose, such as read-only, or read-write. A directory is an inode that contains a list of inodes for each file and directory that is located in the directory/inode. With continued reference to the example of FIG. 1, the filesystem 104 may comprise a directory 106 that contains a list of inodes 108, each of which corresponds to a respective file or directory 110.

The example architecture 100 may further comprise a respective pointer array 112 for each of the processes 102 in the system. Each of the pointers 114 in the pointer array 112 points to a respective inode 108 which, as noted earlier, corresponds to a particular directory or file 110. As discussed in more detail elsewhere herein, the pointer array 112 may be updated from time to time.

Finally, the example architecture 100 may comprise file access pattern logic (FAPL) 116. In general, the FAPL 116 may monitor calls 118 made by the processes 102 to files 110 in the filesystem 104. The FAPL 116 may also comprise, or access, a respective counter 120 for each process 102 such that, for example, when a process 102 requests access to a file 110, and a pointer 114 to that file 110 is present in the array 112, the counter 120 may be incremented for the process 102 that requested access to that file 110. Further details concerning these, and other, example operations of the FAPL 116 are disclosed in the discussion of FIG. 2 below.

B. EXAMPLE METHODS

Figure 2:
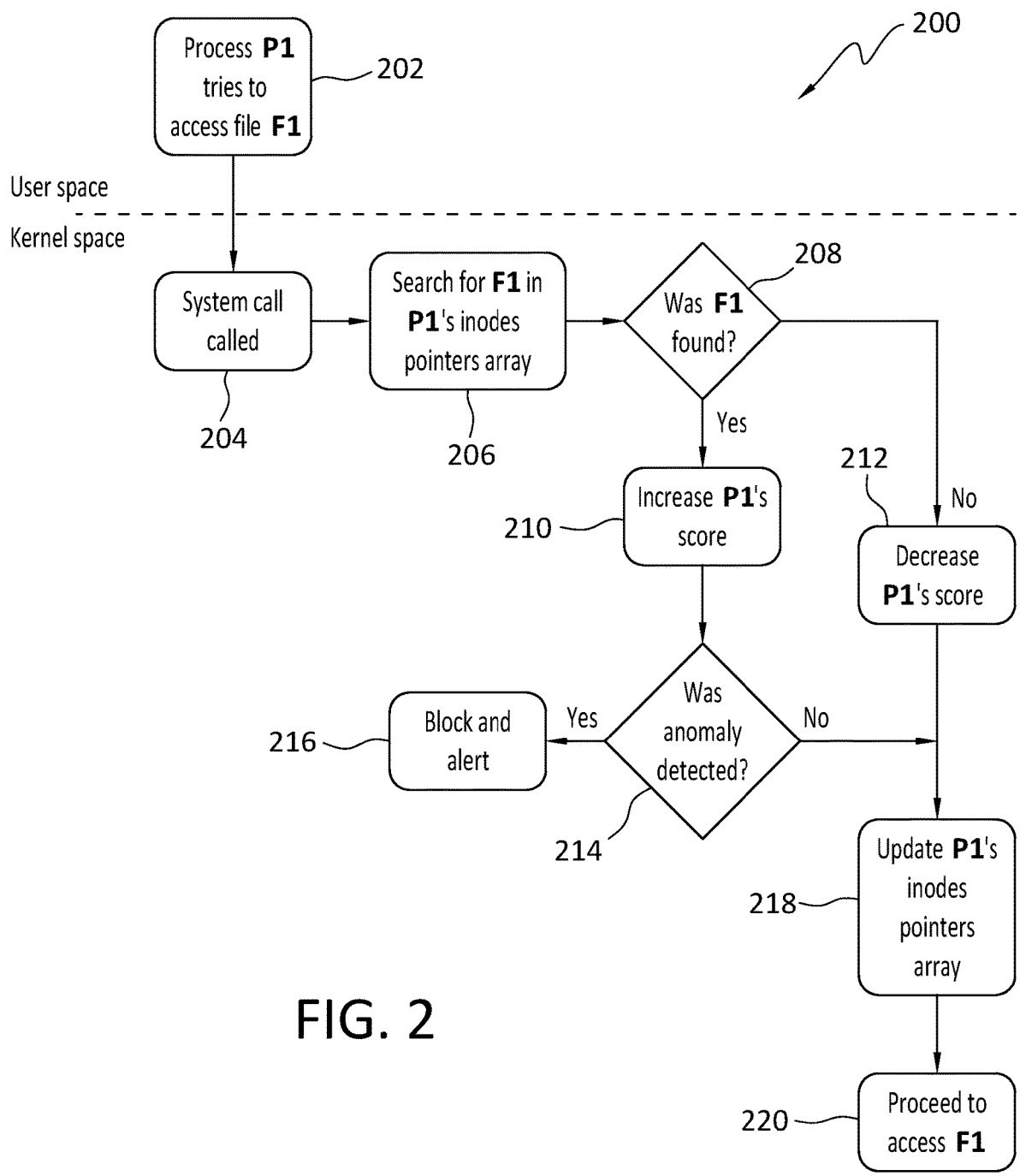
FIG. 2 discloses aspects of an example method according to one embodiment.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

In general, a method according to one embodiment may be performed in whole or in part by FAPL, examples of which are disclosed herein, and may involve monitoring process accesses to a filesystem, specifically, the inodes of the filesystem, to detect behavior patterns indicative of ransomware processes and operations. By focusing on the "scanning" phase of ransomware operating in a filesystem, an embodiment may identify a pattern of the ransomware accessing files and their properties, as many ransomware types are programmed to do. The scan that is performed by the ransomware will typically be systematic and will aim to be inclusive, accessing as many files as possible. For example, when ransomware accesses a directory, the ransomware scan may be expected to proceed to each of the files and subfolders, recursively.

Thus, an embodiment of the invention comprises a scoring method that increases a score of a process when the actions of that process to access files, that is, inodes, are observed to be matching what is considered to be a pattern of a malicious process, such as ransomware. A ransomware detection approach, according to one embodiment, will be managed at the filesystem level, that is, the kernel space in a Linux® system, making the ransomware detection process invisible to the user space applications, including any ransomware running in the user space.

Directing attention now to FIG. 2, an example method according to one embodiment is denoted generally at 200. For each process 202 in a system, a respective array may be managed that includes, or is updated to include, pointers to inodes that have been, and/or are likely to be, accessed in case the process 202 comprises ransomware. At each call 204 by the process 202 to a file (or, an inode where the method 200 is being performed in a Linux® system), a search 206 may be performed of the pointer array that corresponds to the process 202. In particular, the search 206 may check the pointer array to determine if the pointer array includes a pointer to the file, or inode, to which access was requested by the process 202.

If it is determined 208 that the pointer array for the process 202 includes a pointer to the file that the process 202 requested access to, a score for the process 202 may be incremented 210. On the other hand, if the pointer array does not include a pointer to the file that the process 202 requested access to, the score for the process 202 may be decremented 212.

Note that, in general, the higher the score of the process 202, the more files the process 202 has requested access to and, thus, the more likely it may be that the process 202 comprises a ransomware process. On the other hand, a legitimate, that is, non-ransomware, process may only request access to a few files and, as such, would tend to have a lower score than a ransomware process.

Returning now to the example method 200, after a process 202 score has been increased 210, that increase may trigger performance of a check 214 to determined if an anomaly was detected. If an anomaly is determined 214 to be present, the process 202 may be blocked 216, and an alert sent to an administrator. The blocking 216 of the process may comprise, for example, preventing the process 202 from accessing any files in the filesystem.

On the other hand, if no anomaly is determined 214 to be present, or if the score for the process 202 has been decremented 212, the pointer array for the process 202 may be updated 218 to the file to which the process 202 requested access. After the update 218 has been completed, access to the requested file may then be granted 220 to the process 202.

Thus, even if no anomalies are detected at 214, over multiple iterations of the process 202, the process score may ultimately exceed a threshold that is indicative of the presence of ransomware in the system. In this way, an embodiment may provide a fail-safe to identify anomalies even if other anomaly detection functions, such as at 214, somehow fail to identify a problem.

In more detail, with respect to updating 218 of the pointer array, and the scoring operations 210 and 212, the file access pattern logic (FAPL) updates the inode pointer array of that process 202. In the case that the process 202 comprises ransomware, the score of the process 202 may sharply increase, and it may be possible to indicate 214 an anomaly by the increase in that score. Such an indication may be used with relatively high confidence to conclude that the process 202 comprises a ransomware process.

In an embodiment, the FAPL may correspond to the way that ransomware performs a filesystem scan. Typically, ransomwares scan a filesystem recursively, in "pre-order" traversal, also referred to as "topological ordering." Consistent with that behavior, at each iteration of the ransomware process, the inode pointers array may be updated by the FAPL with the next inodes in the topological structure of the filesystem, since the ransomware process has requested access to those inodes, or files. That is, when a process, such as the process 202 for example, is accessing the inode of a directory, the list of inodes of the files and the directories that are in that directory will be added to the pointer array for that process. By way of contrast, legitimate software that randomly accesses different files will probably not be detected as ransomware, because its score will be decreased every time a file it accesses is not found in the inodes pointers array of that process. This is shown at 212 in FIG. 2.

Thus, an embodiment of the invention may implement live, that is, real time, detection of ransomware activity by monitoring usage behavior of OS (operating system) inodes. Moreover, this detection of ransomware activity in the filesystem scanning phase, may be performed in a manner that is invisible to a user space.

C. FURTHER EXAMPLE EMBODIMENTS

Following are some further example embodiments of the invention. These are presented only by way of example and are not intended to limit the scope of the invention in any way.

Embodiment 1. A method, comprising: monitoring a file access request made by a process; searching, in a pointer array that corresponds to the process, for a pointer to the file that was requested by the process; when the pointer is found in the pointer array, incrementing a score associated with the process; performing an anomaly detection check; and when an anomaly is detected, blocking access to the file by the process, and when no anomaly is detected, updating the pointer array to include a pointer to the file to which access was requested by the process.

Embodiment 2. The method as recited in any preceding embodiment, wherein when a value of the score exceeds a threshold, the process is inferred to comprise a ransomware process, and the process is prevented from accessing the file.

Embodiment 3. The method as recited in any preceding embodiment, wherein when the pointer is not found in the pointer array, the score associated with the process is decremented.

Embodiment 4. The method as recited in any preceding embodiment, wherein the process operates in a user space, and the monitoring, the searching, the incrementing, the performing, and the updating, are performed in a kernel space.

Embodiment 5. The method as recited in any preceding embodiment, wherein the file comprises an inode of a filesystem.

Embodiment 6. The method as recited in any preceding embodiment, wherein the anomaly is indicative of a ransomware process.

Embodiment 7. The method as recited in any preceding embodiment, wherein the file access request is one of multiple file access requests that are being monitored.

Embodiment 8. The method as recited in any preceding embodiment, wherein when no anomaly is detected, and the score is below a threshold, access is granted to the file.

Embodiment 9. The method as recited in any preceding embodiment, wherein a recursive scanning of a filesystem that includes the file causes the score to exceed a threshold indicative of ransomware.

Embodiment 10. The method as recited in any preceding embodiment, wherein the process runs in a user space, and the monitoring, the searching, the incrementing, the performing, and the updating, are not perceptible by the process.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

D. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
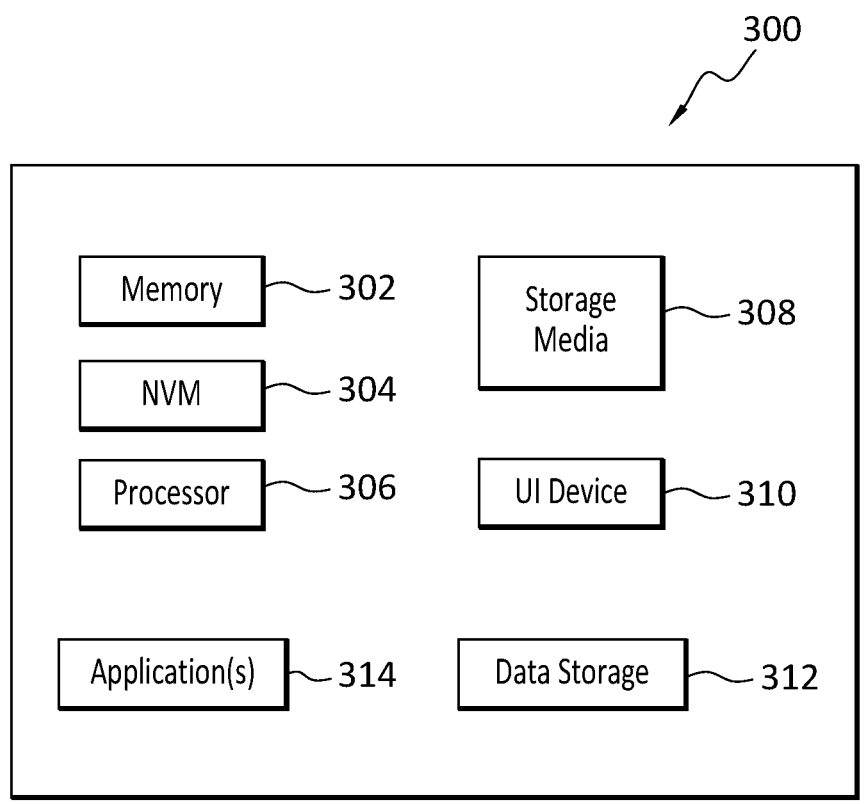
FIG. 3 discloses an example computing entity operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   monitoring a file access request made by a process;
   in response to the file access request, searching, in a pointer array that corresponds to the process, for a pointer to the file that was requested by the process;
   when the pointer is found in the pointer array, incrementing a score associated with the process;
   performing an anomaly detection check; and when an anomaly is detected, blocking access to the file by the process, and when no anomaly is detected, updating the pointer array to include a pointer to the file to which access was requested by the process.

2. The method as recited in claim 1, wherein when a value of the score exceeds a threshold, the process is inferred to comprise a ransomware process, and the process is prevented from accessing the file.

3. The method as recited in claim 1, wherein when the pointer is not found in the pointer array, the score associated with the process is decremented.

4. The method as recited in claim 1, wherein the process operates in a user space, and the monitoring, the searching, the incrementing, the performing, and the updating, are performed in a kernel space.

5. The method as recited in claim 1, wherein the file comprises an inode of a filesystem.

6. The method as recited in claim 1, wherein the anomaly is indicative of a ransomware process.

7. The method as recited in claim 1, wherein the file access request is one of multiple file access requests that are being monitored.

8. The method as recited in claim 1, wherein when no anomaly is detected, and the score is below a threshold, access is granted to the file.

9. The method as recited in claim 1, wherein a recursive scanning of a filesystem that includes the file causes the score to exceed a threshold indicative of ransomware.

10. The method as recited in claim 1, wherein the process runs in a user space, and the monitoring, the searching, the incrementing, the performing, and the updating, are not perceptible by the process.

11. A non-transitory storage medium having stored therein instructions that are executable by one or more hardware processors to perform operations comprising:
monitoring a file access request made by a process;
in response to the file access request, searching, in a pointer array that corresponds to the process, for a pointer to the file that was requested by the process;
when the pointer is found in the pointer array, incrementing a score associated with the process;
performing an anomaly detection check; and
when an anomaly is detected, blocking access to the file by the process, and when no anomaly is detected, updating the pointer array to include a pointer to the file to which access was requested by the process.

12. The non-transitory storage medium as recited in claim 11, wherein when a value of the score exceeds a threshold, the process is inferred to comprise a ransomware process, and the process is prevented from accessing the file.

13. The non-transitory storage medium as recited in claim 11, wherein when the pointer is not found in the pointer array, the score associated with the process is decremented.

14. The non-transitory storage medium as recited in claim 11, wherein the process operates in a user space, and the monitoring, the searching, the incrementing, the performing, and the updating, are performed in a kernel space.

15. The non-transitory storage medium as recited in claim 11, wherein the file comprises an inode of a filesystem.

16. The non-transitory storage medium as recited in claim 11, wherein the anomaly is indicative of a ransomware process.

17. The non-transitory storage medium as recited in claim 11, wherein the file access request is one of multiple file access requests that are being monitored.

18. The non-transitory storage medium as recited in claim 11, wherein when no anomaly is detected, and the score is below a threshold, access is granted to the file.

19. The non-transitory storage medium as recited in claim 11, wherein a recursive scanning of a filesystem that includes the file causes the score to exceed a threshold indicative of ransomware.

20. The non-transitory storage medium as recited in claim 11, wherein the process runs in a user space, and the monitoring, the searching, the incrementing, the performing, and the updating, are not perceptible by the process.

* * * * *